Nov. 7, 1944.  W. D. JORDAN  2,361,947
SOLDERING MACHINE
Filed May 24, 1941  3 Sheets-Sheet 1
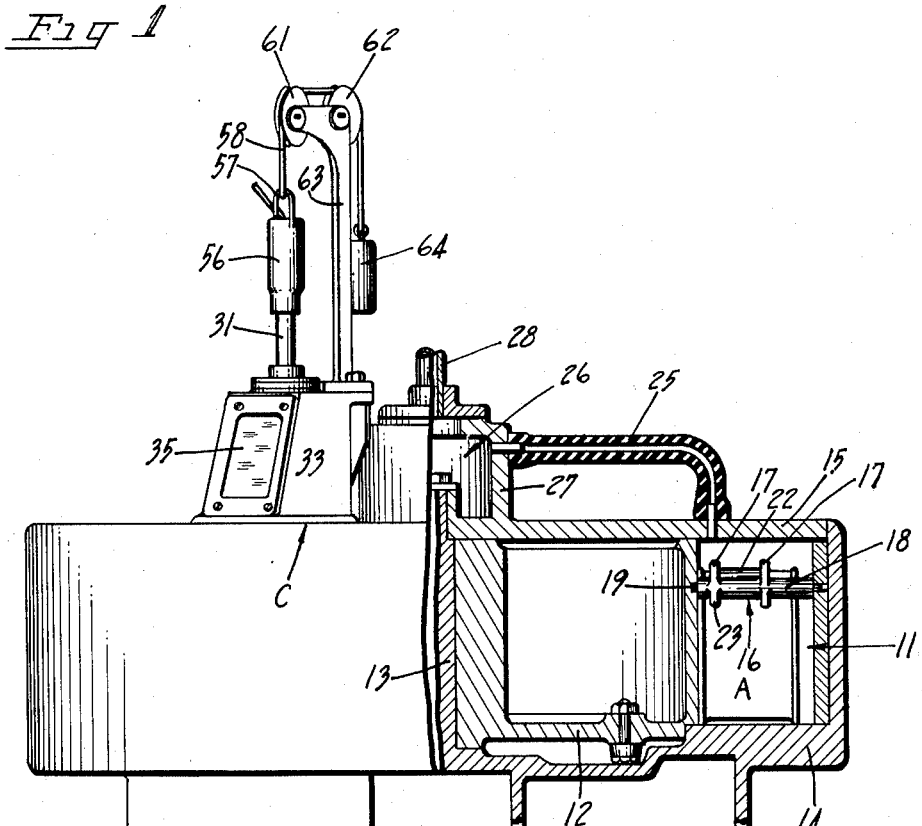
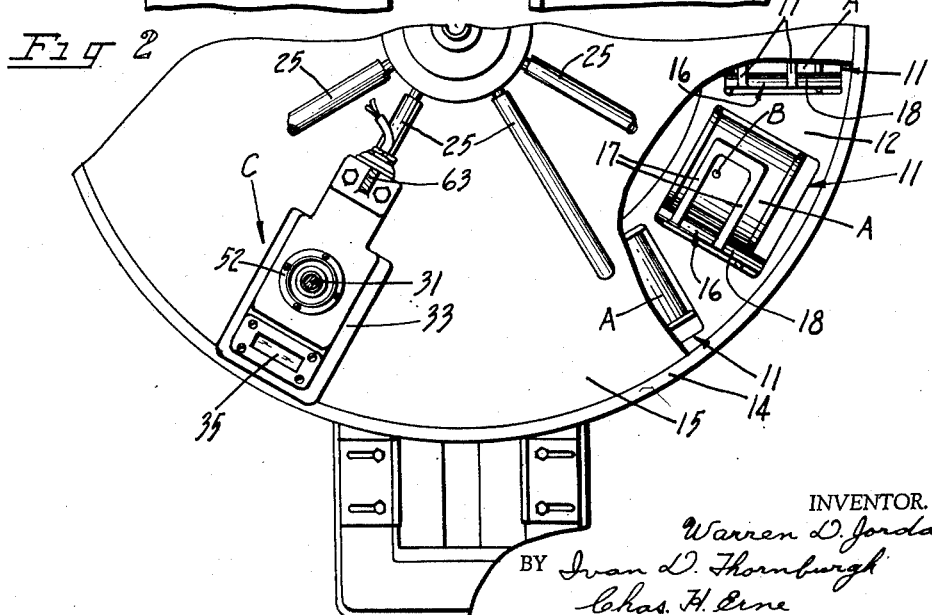
INVENTOR.
Warren D. Jordan
BY Ivan D. Thornburgh
Chas. H. Erne
ATTORNEYS Nov. 7, 1944.   W. D. JORDAN   2,361,947
SOLDERING MACHINE
Filed May 24, 1941   3 Sheets-Sheet 2

INVENTOR.
Warren D. Jordan
BY Ivan D. Thornburgh
Chas. H. Erne
ATTORNEYS

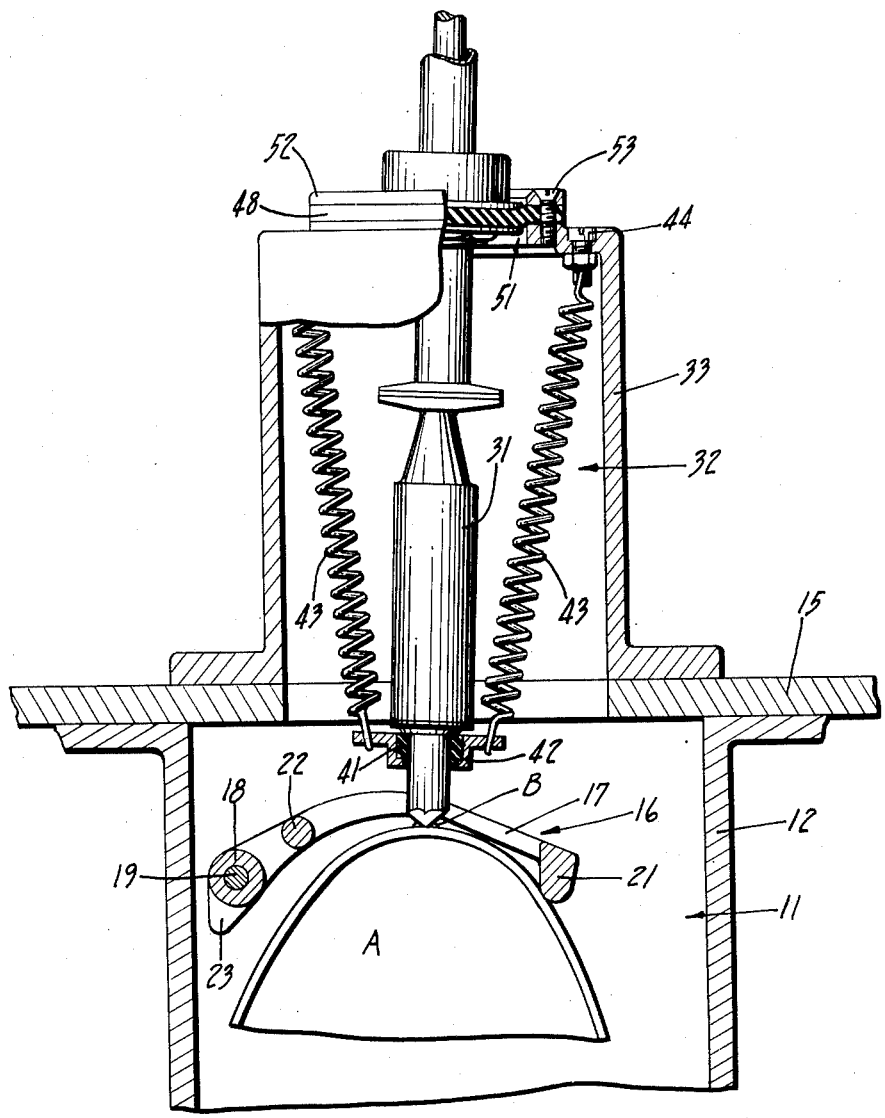

Patented Nov. 7, 1944

2,361,947

UNITED STATES PATENT OFFICE 2,361,947

SOLDERING MACHINE

Warren D. Jordan, Waukegan, Ill., assignor to American Can Company, New York, N. Y., a corporation of New Jersey Application May 24, 1941, Serial No. 395,103

2 Claims. (Cl. 113—82)

The present invention relates to container or can soldering machines and has particular reference to a manually operated soldering device for solder tipping vacuumized cans.

In the packaging of certain products in sheet metal cans, the product is filled into the can and the latter completely sealed with the exception of a small vent hole. The can is vacuumized through this vent hole and the hole is sealed with a drop of solder to completely seal the can and to retain its vacuumized condition.

The present invention contemplates a manually operated soldering device for sealing the vent holes in such cans with a drop of solder.

An object of the invention is the provision of a soldering device for solder tipping vent holes in vacuumized cans wherein the soldering element is yieldably suspended above the path of travel of the cans to be sealed so that the solder element may be shifted in any desirable direction for engagement with the can and will yet return to a normal position after completion of a soldering operation.

Numerous other objects and advantages of the invention will be apparent as it is better understood from the following description, which, taken in connection with the accompanying drawings, discloses a preferred embodiment thereof.

Referring to the drawings:

Figure 1 is a part elevational and part sectional side view of a portion of a can soldering machine embodying the instant invention, parts being broken away;

Fig. 2 is a fragmentary top plan view of the machine shown in Fig. 1, with parts broken away, and Figs. 3 and 4 are enlarged sectional views of the soldering device used in the machine disclosed in Fig. 1, the views showing the soldering element in different positions relative to a can to be sealed, with parts broken away.

Figure 3:
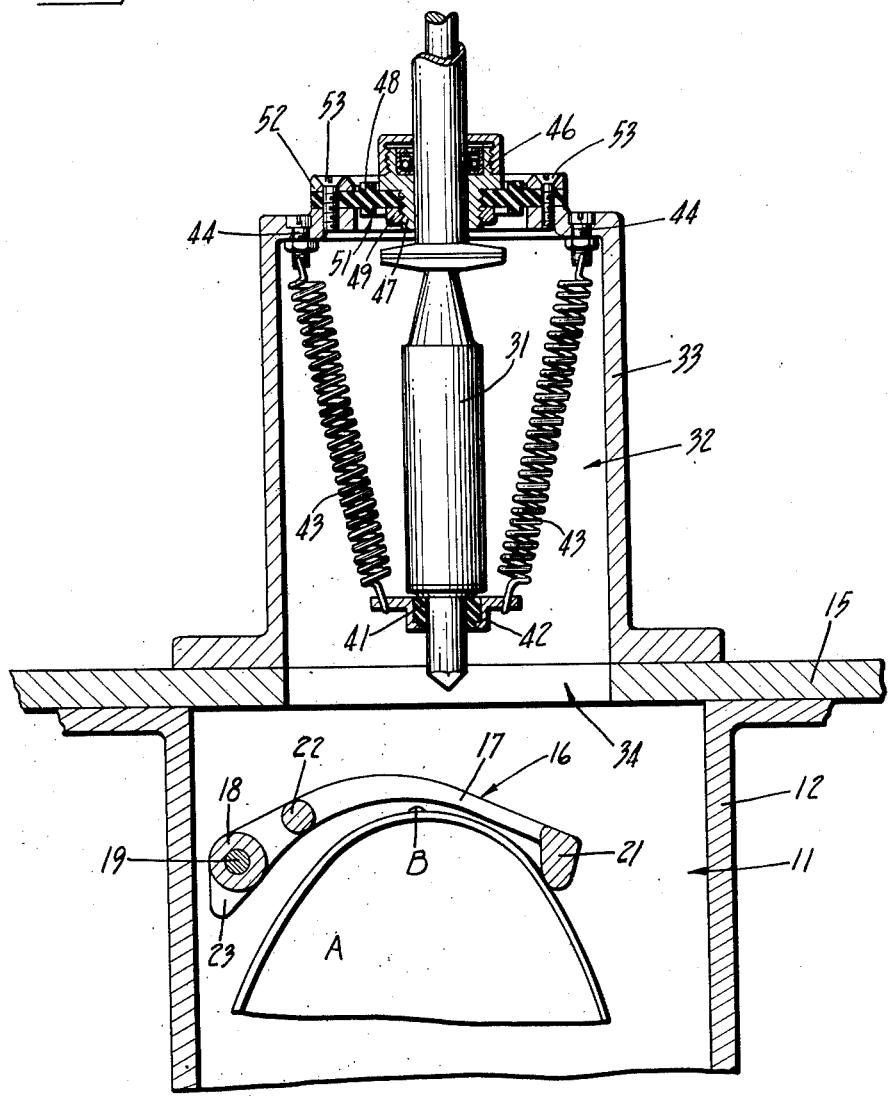

As a preferred embodiment of the instant invention the drawings illustrate principal parts of a can vacuumizing and soldering machine in which irregular shaped sheet metal cans A, known in the industry as ham cans, are vacuumized and sealed. The cans which are subjected to steps of vacuumizing and sealing are filled and are completely closed when received in the present machine, with the exception of a small vent hole in the body which is sealed after the can is vacuumized in such a machine. Sealing of the vacuumized can is effected by melting and spreading a drop or pellet B (Fig. 3) of solder over the hole, the can already being tipped adjacent the hole.

In such a machine a can A to be sealed is placed in one of a plurality of pockets 11 (Fig. 1) of an intermittently rotated horizontal turret 12 which is mounted on a stationary post 13. The post is formed integrally with a stationary casing 14 which extends along the bottom of the turret and which surrounds the outer periphery of the turret. A stationary cover plate 15 for the casing fits over the turret and hermetically seals the latter in the casing.

The cans A shown in the drawings are of the character used for packing hams and have a body shaped generally similar to the letter D. The cans in the turret pockets are in a vertical position resting on the flat portion of the body with the curved portion upward. The vent hole is in this curved portion.

In order to hold the cans in a predetermined position a claw shaped holding element 16 is provided in each turret pocket. This claw element includes a pair of spaced and parallel arms 17 (Figs. 1 and 3) which curve over the top of the can A. These arms are formed on a long hub 18 which is mounted on a pivot shaft 19 carried in bearings formed in the turret 12. The free ends of the arms are connected by a heavy tie-bar section 21 which serves as a weight to hold the arms down on the can.

A cross bar 22 also connects the arms 17 adjacent the hub and strengthens the claw. When no can is in a turret pocket the claw is prevented from dropping down by a pair of stop lugs 23 which are formed on the hub. These lugs engage against the turret wall which encloses the pocket and thus supports the claw.

The rotating turret 12 carries a can A through the interior of the casing 14 and along a curved path with an intermittent or step-by-step movement. During this travel of the can it is vacuumized through the unsealed vent hole. Vacuumization of the can is brought about by drawing a vacuum on the pocket of the turret at a time it comes to rest between certain advance movements. For this purpose there are a plurality of flexible hose connections 25 (Fig. 1) which connect the interior of the casing 14 above the path of travel of the cans, with a vacuum chamber 26 in a central hollow boss 27 formed on the cover plate 15.

The ends of the hose connections 25 are secured in the cover plate 15 and in the boss 27. A suction pipe 28 is secured to the housing 27 and is in communication with the vacuum chamber 26.

This pipe leads from any suitable source of vacuum.

When a can has nearly completed its circuit through the casing 14 it is sufficiently vacuumized to be sealed and the next step rotation of the turret brings it into a soldering station C (Figs. 1, 2, 3 and 4) preparatory to sealing. At this station the can comes to rest in vertical alignment with a manually operable electric soldering iron 31 which is disposed in a chamber 32 enclosed by an open bottom housing 33.

The housing 33 is hermetically secured to the cover plate 15 over an opening 34 formed in the cover plate so that the vacuumized condition of the can will be maintained. One side of the housing is fitted with a window 35 so that an operator may have a view of the enclosed soldering iron and the top of the can A to be sealed.

Inside the housing 33, the soldering iron is fitted with a surrounding insulating washer 41 which is secured in a cup shaped disc 42. The disc is connected to the lower ends of a pair of tension springs 43. The upper ends of the springs are secured in screws 44 which are threaded into the top of the housing. These springs are located on diametrically opposite sides of the soldering iron and yieldably hold the iron in suspension, as best shown in Fig. 3.

The top end of the soldering iron 31 extends up through in sliding engagement with a hermetic stuffing box 46 which is formed with a threaded bearing shank 47. The shank extends through a resilient annular disc 48 preferably made of rubber and is locked in place by a lock-nut 49 on the stuffing box shank 47. The rubber disc 48 is disposed in an opening 51 in the top of the housing 33 and its outer peripheral edge is hermetically secured to the housing by a clamp ring 52 and screws 53. This connection for the soldering iron constitutes a universal joint which permits the iron to be reciprocated vertically and laterally shifted in any desired direction by the operator.

Outside the housing 33 the soldering iron is formed with an actuating handle 56 (Fig. 1). This handle has a loop 57 to which one end of a cable 58 is secured. The cable extends over a pair of spaced pulleys 61, 62 which are carried in a bracket 63 secured to the housing 33. The opposite end of the cable is secured to a weight 64 which counter balances the weight of the soldering iron. This reduces the dead weight on the springs 43.

When a can A arrives at the soldering station C, an operator standing alongside the machine grasps the handle 56 of the soldering iron and by looking through the window 35 in the housing 33 directs the point of the iron as desired. Thus he may push the iron down and sidewise into engagement with the spot of solder on the can, as best shown in Fig. 4. This melts the solder and spreads it over the vent hole in the can. This soldering operation seals the can and thus maintains the vacuum condition within the can.

After such a soldering operation, the operator merely releases his hold on the iron and it is drawn upwardly by the springs 43. The springs thus insure that the iron is clear of the can before the turret again makes another step rotation and thus prevents jamming of the machine by reason of the iron being caught between the turret and the cover plate 15.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for solder tipping vent holes in containers, the combination of a casing enclosing a chamber maintained in a vacuumized condition, a universal joint in a wall of said casing, a manually operable soldering iron slidably mounted in said universal joint and projecting into said chamber for solder tipping a container located in said chamber, a cable secured at an end thereof to said soldering iron, a pulley over which the cable operates, a weight attached to the opposite end of said cable for counter-balancing the weight of said soldering iron and for drawing said iron towards said casing wall, and a plurality of diametrically opposed tension springs each secured at one end to the inner side of said casing and secured at its opposite end to the inner end of said soldering iron for centering the latter in normal depending position and for drawing said iron away from the container upon said iron being released after a solder tipping operation.

2. In a machine for solder tipping vent holes in containers, the combination of a casing enclosing a chamber maintained in a vacuumized condition, said casing having an opening in a wall thereof and an annular resilient flexible disc element having means for clamping the same at its opposite peripheral surfaces to said casing for closing said opening, a manually operable soldering iron permanently mounted for slidable movement centrally of said disc element and projecting into said chamber, means surrounding said soldering iron and engaging said disc element for spacing the iron from the disc, said resilient disc element constituting a flexible universal mounting for the soldering iron and movable out of its normal plane to permit free swinging movement of the latter for a solder tipping operation on a container in said chamber, and spring means disposed on opposite sides of said soldering iron and secured at their opposite ends to said casing and iron respectively for supporting said iron and for returning the same to normal position after a solder tipping operation.

WARREN D. JORDAN.